(12) United States Patent
Pasternack et al.

(10) Patent No.: US 11,238,221 B2
(45) Date of Patent: Feb. 1, 2022

(54) LANGUAGE PROFILING SERVICE

(71) Applicant: Microsoft Technology Licensing, LLC, Redmond, WA (US)

(72) Inventors: Jeffrey William Pasternack, Belmont, CA (US); Vita G. Markman, San Francisco, CA (US); Romer E. Rosales-Delmoral, Burlingame, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 16/446,162

(22) Filed: Jun. 19, 2019

(65) Prior Publication Data

US 2020/0401657 A1 Dec. 24, 2020

(51) Int. Cl.
| | |
|---|---|
| *G06F 40/263* | (2020.01) |
| *G06F 40/44* | (2020.01) |
| *G06F 40/55* | (2020.01) |
| *G06F 40/216* | (2020.01) |
| *G06F 40/284* | (2020.01) |
| *G06F 40/289* | (2020.01) |
| *G06N 20/00* | (2019.01) |
| *G06N 3/08* | (2006.01) |
| *G06N 20/20* | (2019.01) |
| *G06N 5/00* | (2006.01) |
| *G06N 20/10* | (2019.01) |

(52) U.S. Cl.
CPC .......... *G06F 40/263* (2020.01); *G06F 40/216* (2020.01); *G06F 40/284* (2020.01); *G06F 40/289* (2020.01); *G06F 40/44* (2020.01); *G06F 40/55* (2020.01); *G06N 20/00* (2019.01); *G06N 3/08* (2013.01); *G06N 5/003* (2013.01); *G06N 20/10* (2019.01); *G06N 20/20* (2019.01)

(58) Field of Classification Search
CPC ........ G06F 40/263; G06F 40/44; G06F 40/55; G06F 40/216; G06F 40/284; G06F 40/289; G06N 20/00; G06N 3/08; G06N 20/20; G06N 5/003; G06N 20/10
USPC ........................................................... 704/8
See application file for complete search history.

(56) References Cited

U.S. PATENT DOCUMENTS 9,544,656 B1 * 1/2017 Nichols .............. G06K 9/00355
9,858,340 B1 * 1/2018 Frey .................... G06K 9/6296
(Continued)

*Primary Examiner* — Edwin S Leland, III
(74) *Attorney, Agent, or Firm* — Schwegman Lundberg & Woessner, P.A.

(57) ABSTRACT

Methods, systems, and computer programs are presented for estimating the language used in a user communication. One method includes an operation for utilizing counters to track use of languages by a user of an online service, the counters being updated based on interactions of the user in the online service. Further, the method includes operations for detecting a text entered by the user and obtaining, by a language classifier, an initial prediction having probabilities for the languages that the text is in the language. A language distribution prediction is calculated based on the initial prediction and the user counters, where the language distribution prediction comprises a probability, for each language, that the text is in the language. Further, the method includes operations for selecting a language used in the text based on the language distribution prediction and causing presentation on a display of a message in the selected language.

19 Claims, 11 Drawing Sheets

USER TABLE EXAMPLE

| USER URN | TOP-RANKED-COUNT | | | PROBABILITY-SUM | | | LOG-PROBABILITY-SUM | | | RECIPROCAL-RANK-SUM | | | |
|---|---|---|---|---|---|---|---|---|---|---|---|---|---|
| | EN | ES | CN | EN | ES | CN | EN | ES | CN | EN | ES | CN | ... |
| 1257 | 204 | 34 | 5 | 25.78 | 14.2 | 0.9 | 1.41 | 1.15 | -0.04 | 195 | 45 | 3 | |

NUMBER OF TIMES THIS LANGUAGE WAS TOP PREDICTION
SUM OF PROBABILITIES FOR LANGUAGE ACROSS ALL PREDICTIONS
SUM OF LOG PROBABILITIES FOR LANGUAGE ACROSS ALL PREDICTIONS
SUM OF 1/RANK(LANGUAGE) ACROSS ALL PREDICTIONS

(56) References Cited

U.S. PATENT DOCUMENTS

| | | | |
|---|---|---|---|
| 10,417,567 B1* | 9/2019 | Miller | G06N 3/006 |
| 10,565,320 B1* | 2/2020 | Liu | G06N 5/003 |
| 2014/0035823 A1* | 2/2014 | Khoe | G06F 3/0237 |
| | | | 345/171 |
| 2016/0110340 A1* | 4/2016 | Bojja | G06F 40/263 |
| | | | 704/9 |
| 2017/0337263 A1* | 11/2017 | Muralidharan | G06F 16/9535 |
| 2018/0083898 A1* | 3/2018 | Pham | H04L 51/02 |
| 2018/0095624 A1* | 4/2018 | Osman | H04L 51/043 |
| 2018/0210874 A1* | 7/2018 | Fuxman | G06F 40/35 |
| 2018/0232451 A1* | 8/2018 | Lev-Tov | G06N 3/08 |
| 2019/0065458 A1* | 2/2019 | Brunet | G06Q 50/01 |
| 2019/0318735 A1* | 10/2019 | Chao | G10L 15/14 |
| 2019/0347668 A1* | 11/2019 | Williams | H04L 67/2833 |
| 2019/0361937 A1* | 11/2019 | Rogynskyy | G06F 16/23 |
| 2019/0372923 A1* | 12/2019 | Pasternack | G06F 40/263 |
| 2019/0392820 A1* | 12/2019 | Chae | G10L 15/183 |
| 2020/0097539 A1* | 3/2020 | Katz | G06F 40/263 |
| 2020/0134013 A1* | 4/2020 | Pasternack | G06F 16/337 |
| 2020/0293585 A1* | 9/2020 | Pasternack | G06F 40/30 |
| 2020/0297458 A1* | 9/2020 | Roschin | G06F 40/10 |
| 2020/0401657 A1* | 12/2020 | Pasternack | G06F 40/216 |

\* cited by examiner

USER TABLE EXAMPLE

| USER URN | TOP-RANKED-COUNT | | | PROBABILITY-SUM | | | LOG-PROBABILITY-SUM | | | RECIPROCAL-RANK-SUM | | | ... |
|---|---|---|---|---|---|---|---|---|---|---|---|---|---|
| | EN | ES | CN | EN | ES | CN | EN | ES | CN | EN | ES | CN | |
| 1257 | 204 | 34 | 5 | 25.78 | 14.2 | 0.9 | 1.41 | 1.15 | -0.04 | 195 | 45 | 3 | |
| ... | | | | | | | | | | | | | |

502

NUMBER OF TIMES THIS LANGUAGE WAS TOP PREDICTION

SUM OF PROBABILITIES FOR LANGUAGE ACROSS ALL PREDICTIONS

SUM OF LOG PROBABILITIES FOR LANGUAGE ACROSS ALL PREDICTIONS

SUM OF 1/RANK(LANGUAGE) ACROSS ALL PREDICTIONS

Fig. 6

LANGUAGE PROFILING SERVICE

TECHNICAL FIELD

The subject matter disclosed herein generally relates to methods, systems, and machine-readable storage media for determining the language used in a communication.

BACKGROUND

Knowing the language users speak is important for many service providers. For example, a social network may tailor services based on the language, or languages, spoken by users. A recruiter advertising on the social network may want to target ads to members that speak a certain language. Also, the social network may wish to tailor the user's feed to make sure that the content in the user's feed is provided in a language that the user speaks; otherwise, the user may feel disappointed by seeing items in an unspoken language.

A multilingual user may issue requests in multiple languages, e.g., German or English, and the results should be filtered to include only results written in a language spoken by the user. Further, if a user speaks only one language, the results should be in the spoken language.

Sometimes users enter their language in their profile within the social network, but more often than not, users do not enter in their profiles all the languages they speak. For example, in some social networks, only around 20% of users may fill out the language section in the profile.

There are methods for long-text language prediction that are usually accurate; even simple models, like the Naive Bayes approach perform well under most scenarios. However, for short or informal text (e.g., search queries, status updates, instant messages), language prediction from the text alone can be hard or impossible. For example, the text message "y?" might mean "Why?" in English or "And?" in Spanish. Existing models may be ignorant of the two choices because the training data may lack information about such; for example, a model trained using Wikipedia data may miss this distinction because of the lack of information on these colloquialisms.

BRIEF DESCRIPTION OF THE DRAWINGS

Various ones of the appended drawings merely illustrate example embodiments of the present disclosure and cannot be considered as limiting its scope.

FIG. 6 illustrates an example user table, according to some example embodiments.

DETAILED DESCRIPTION

Figure 1:
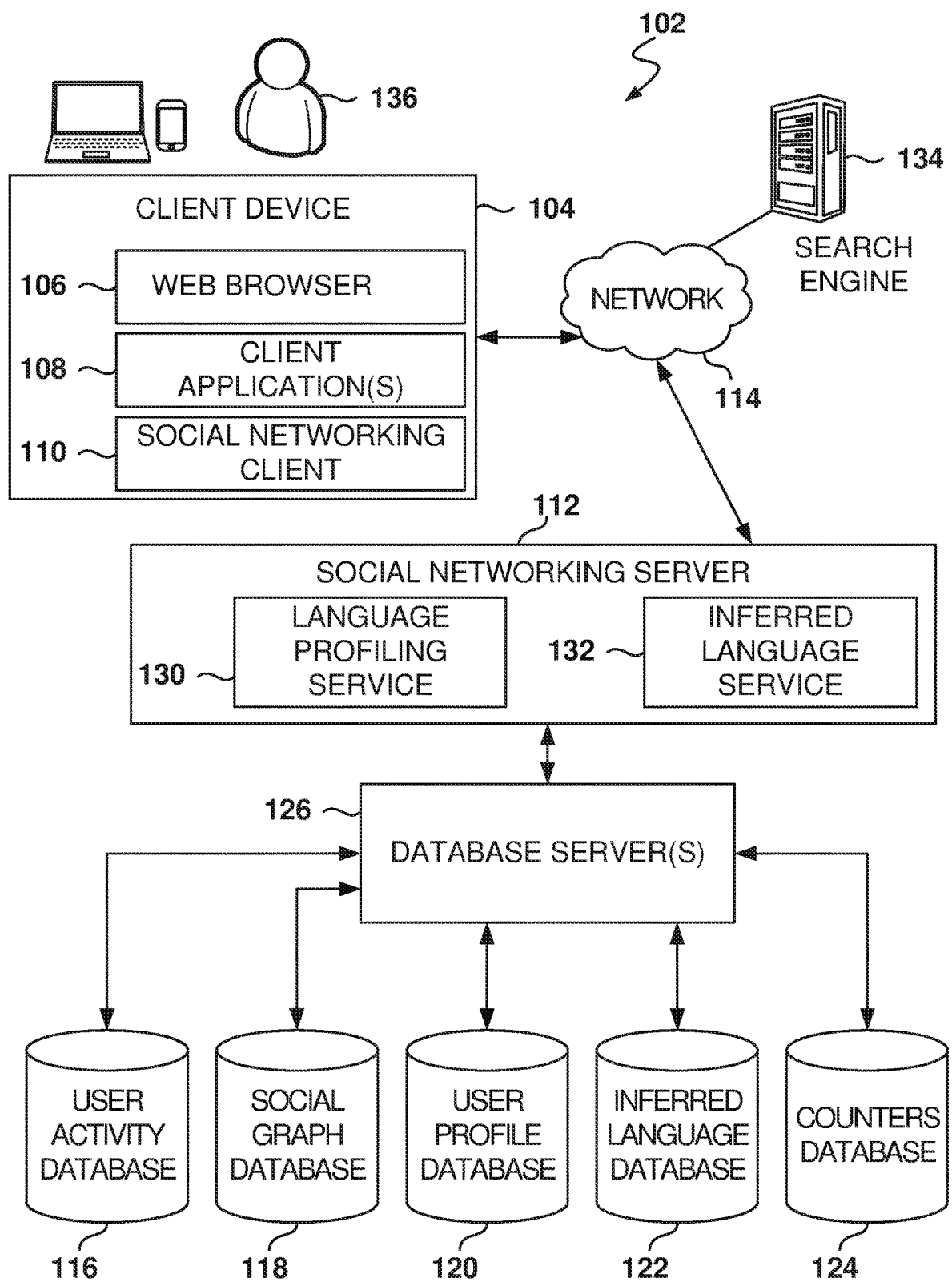
FIG. 1 is a block diagram illustrating a networked system, according to some example embodiments.

Example methods, systems, and computer programs are directed to estimating the language used in a user communication. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Overview

In some online services, such as a social network, user customization relies on the default interface locale for the user to decide the language for the content presented to the user. However, this data may not accurately represent the user's language preference or take into account that the user may speak several languages. Further, the locale information may be inaccurate for some users, and some users may have joined the social network before their native language was supported in the social network (e.g., a German member joining the social network before the German version was available). This may lead to suboptimal experiences for the users within the social network.

Embodiments presented relate to the creation of a language profiling service to improve language prediction for users and refine their linguistic profiles. Existing models do not consistently make correct predictions for ambiguous text based exclusively on the text alone. For example, when suggesting possible short replies to a text message received by the user, if the system does not identify correctly the language of the text message, short replies suggested in the wrong language will cause a very poor user experience.

The language profiling service provides language detection on short text items by leveraging language detection methods for the given short text item (e.g., feed post, comment, message) and by accumulating probability counters for each of the supported languages over time. The counters may be for both the user issuing the text item and for the context in which the text item is issued (e.g., user feed, search query, messaging). Over time, the counters are used to identify the languages used by the users or used in user conversations. The probabilities for the use of each of the languages greatly improve the language prediction capabilities for short text items.

The language profile service keeps track of the counters, for each of the supported languages, for a given user and for each piece of text content that the user interacts with (e.g., reading or writing the message) in each of several contexts, such as user feed, messaging, etc. For example, a user may accumulate probability distributions that identify that the user tends to favor Spanish in the context of an online service feed but tends to favor German in the context of messaging.

One general aspect includes a method that includes an operation for utilizing, by one or more processors, counters to track use of a plurality of languages by a user of an online service. The counters are updated based on interactions of the user in the online service. Further, the method includes operations for detecting, by the one or more processors, a text entered by the user in the online service, and for obtaining, by a language classifier using the one or more processors, an initial prediction having probabilities for the plurality of languages that the text is in the language. The one or more processors calculate a language distribution prediction based on the initial prediction and the counters for the user. The language distribution prediction comprises a probability, for each language, that the text is in the language. Further, the method includes operations for selecting, by the one or more processors, a language used in the text based on the language distribution prediction, and for causing, by the one or more processors, presentation on a display of a message in the selected language.

FIG. 1 is a block diagram illustrating a networked system, according to some example embodiments, including a social networking server 112, illustrating an example embodiment of a high-level client-server-based network architecture 102. Embodiments are presented with reference to an online service, but the principles used herein may be used for any online service accessed by users, such as a social networking service.

The social networking server 112 provides server-side functionality via a network 114 (e.g., the Internet or a wide area network (WAN)) to one or more client devices 104. FIG. 1 illustrates, for example, a web browser 106, client application(s) 108, and a social networking client 110 executing on a client device 104. The social networking server 112 is further communicatively coupled with one or more database servers 126 that provide access to one or more databases 116-124.

The client device 104 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user 136 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, Global Positioning System (GPS) devices, and so forth.

In one embodiment, the social networking server 112 is a network-based appliance that responds to initialization requests or search queries from the client device 104. One or more users 136 may be a person, a machine, or other means of interacting with the client device 104. In various embodiments, the user 136 is not part of the network architecture 102 but may interact with the network architecture 102 via the client device 104 or another means.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a user profile, to authenticate a user 136, to identify or locate other connected users 136, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database servers 126 and databases 116-124. In one example embodiment, the social networking server 112 is communicatively coupled to a user activity database 116, a social graph database 118, a user profile database 120, an inferred-language database 122, and a counters database 124. The databases 116-124 may be implemented as one or more types of databases including, but not limited to, a hierarchical database, a relational database, an object-oriented database, one or more flat files, or combinations thereof.

The user profile database 120 stores user profile information about users 136 who have registered with the social networking server 112. With regard to the user profile database 120, the user 136 may include an individual person or an organization, such as a company, a corporation, a nonprofit organization, an educational institution, or other such organizations.

In some example embodiments, when a user 136 initially registers to become a user 136 of the social networking service provided by the social networking server 112, the user 136 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 120. Similarly, when a representative of an organization initially registers the organization with the social networking service provided by the social networking server 112, the representative may be prompted to provide certain information about the organization, such as a company industry. This information may be stored, for example, in the user profile database 120.

As users 136 interact with the social networking service provided by the social networking server 112, the social networking server 112 is configured to monitor these interactions. Examples of interactions include, but are not limited to, commenting on posts entered by other users 136, viewing user profiles, editing or viewing a user 136's own profile, sharing content outside of the social networking service (e.g., an article provided by an entity other than the social networking server 112), updating a current status, posting content for other users 136 to view and comment on, posting job suggestions for the users 136, searching job postings, and other such interactions. In one embodiment, records of these interactions are stored in the user activity database 116, which associates interactions made by a user 136 with his or her user profile stored in the user profile database 120. A messaging database (not shown) stores messages exchanged among users.

The inferred-language database 122 includes information about the language, or languages, inferred to be spoken by the users 136. The counters database 124 includes a plurality of counters associated with the language utilized by the user during interactions in the social network.

While the database server(s) 126 are illustrated as a single block, one of ordinary skill in the art will recognize that the database server(s) 126 may include one or more such servers. Accordingly, and in one embodiment, the database server(s) 126 implemented by the social networking service are further configured to communicate with the social networking server 112.

The social networking server 112 includes, among other modules, a language profiling service 130 and an inferred-language service. The language profiling service 130 manages the information regarding the language, or languages, utilized by the users of the social network. The inferred-language service analyzes user data to infer the language used by the users during transactions in the social network. More details regarding the functionality of these modules are provided below. Each of the modules may be implemented in software, hardware, or any combination of software and hardware.

The network architecture 102 may also include a search engine 134. Although only one search engine 134 is depicted, the network architecture 102 may include multiple search engines 134. Thus, the social networking server 112 may retrieve search results (and, potentially, other data) from multiple search engines 134. The search engine 134 may be a third-party search engine.

Figure 2:
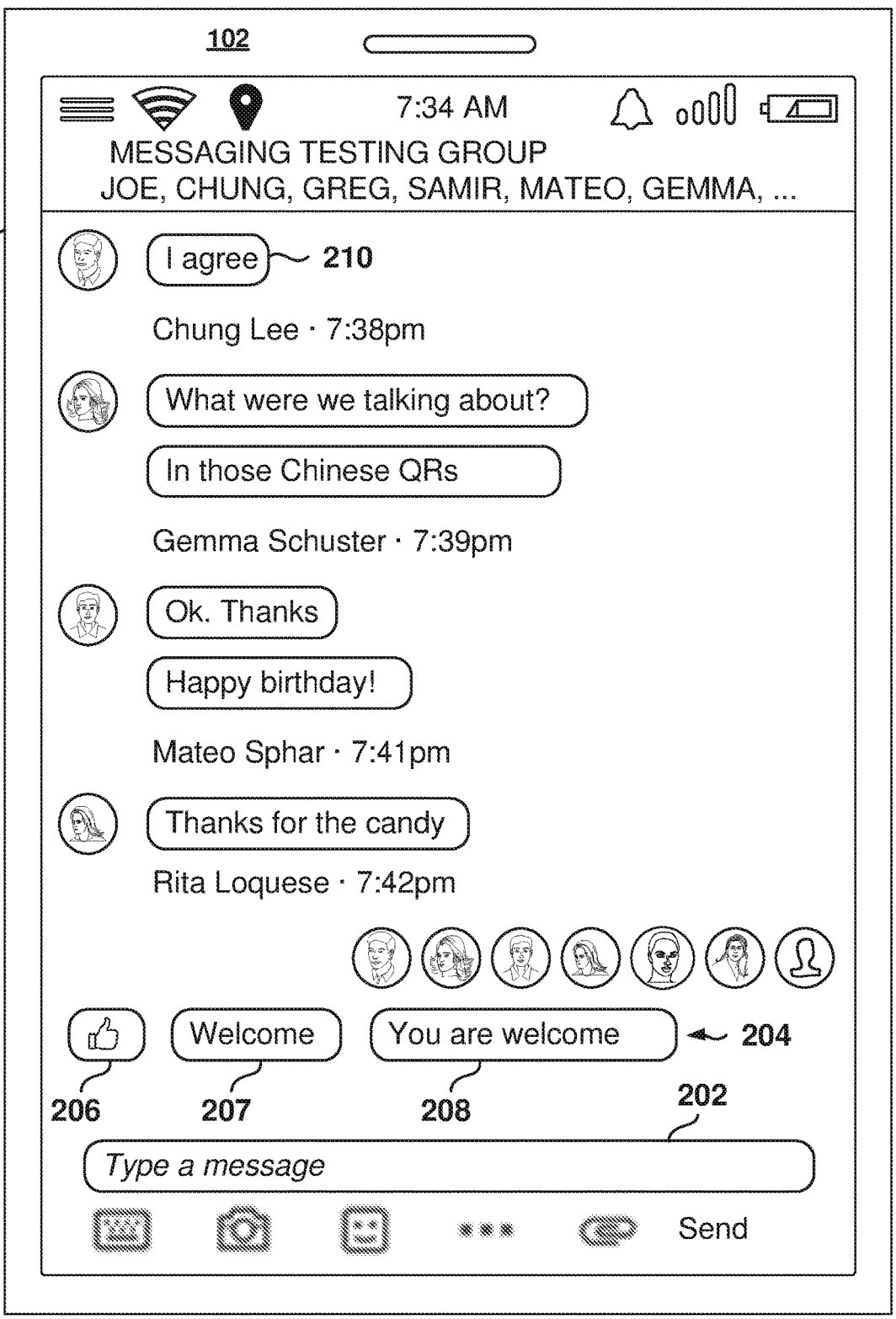
FIG. 2 is a screenshot of a messaging interface including a set of recommended response messages, according to some example embodiments.

FIG. 2 is a screenshot of a messaging interface 200 including a set of recommended response messages 204, also referred to herein as smart replies, according to some example embodiments. As shown, the messaging interface 200 shows a history of messages (e.g., message 210) transmitted between multiple users as part of a communication session. In this example, the most recent message received as part of the communication session is the phrase "Thanks for the candy."

The messaging interface includes a text field 202, which a user can utilize to type a new message, such as "you're welcome." In this example, the messaging interface also includes a set of three recommended responses 204, which a user can select as a response and that will be entered in the messaging interface as if the user had typed or had selected an icon. As shown, the recommended responses 204 include a thumbs-up emoticon 206, a "Welcome" message 207, and a "You are welcome" message 204. Although three recommended messages are shown, other embodiments may include fewer or more recommendations. Rather than use the text field 202 to manually type out a response, the user can select one of the recommended responses 204 with a single input to respond to the message.

In order to provide recommended responses 204, the language-profiling service estimates the language used in the conversation so the system may generate the recommended responses 204 in the correct language. Thus, determining the language is important for a good user experience.

Identifying the language being used by the user is also beneficial in other types of applications. For example, in search queries, determining both the language of the query and the language of potential response documents is needed to match the language of the responses to the language of the query, or at least to the languages spoken by the user performing the search.

Further, determining the language of content in a user feed is used to select items, for presentation to the user, in the languages spoken by the user. Further, when posts in languages not spoken show up in the feed, the system may show an option to "Show translation" to the user, or alternatively, when to show a translated post directly.

When presenting advertisements, knowing the language assists in targeting for users using their preferred languages and in providing language-based insights to advertisers (e.g., "40% of the people clicking on your advertisement are bilingual French and German speakers").

When suggesting new connections to a user of the social network, knowing the language avoids suggesting connections that do not speak a shared language. Additionally, it is easier to select with higher priority users who prefer a using a common language.

For education and training, knowing the language helps presenting courses in languages intelligible to a given user. Additionally, knowing the language helps the social network to identify statistical measurements related to language speakers, such as the growth of non-English speaking users on the social network. Further yet, knowing the language helps with standardization internationally, such as to predict the language of user-supplied tags, profile data, user titles, etc.

Some existing solutions rely on using the language identified by the user when entering profile information as well as tracking the language used by connections of the user, educational institutions attended by the user, and country-specific email domains. However, this approach does not take into account user's interactions with content on the social network and does not monitor the languages that the user prefers to use depending on the context where the user is entering text.

Further yet, other solutions are based on predicting language based on the text, such as language classifiers. However, this approach does not track historical information nor the information about the user, so accuracy is limited, especially for short text messages.

Figure 3:
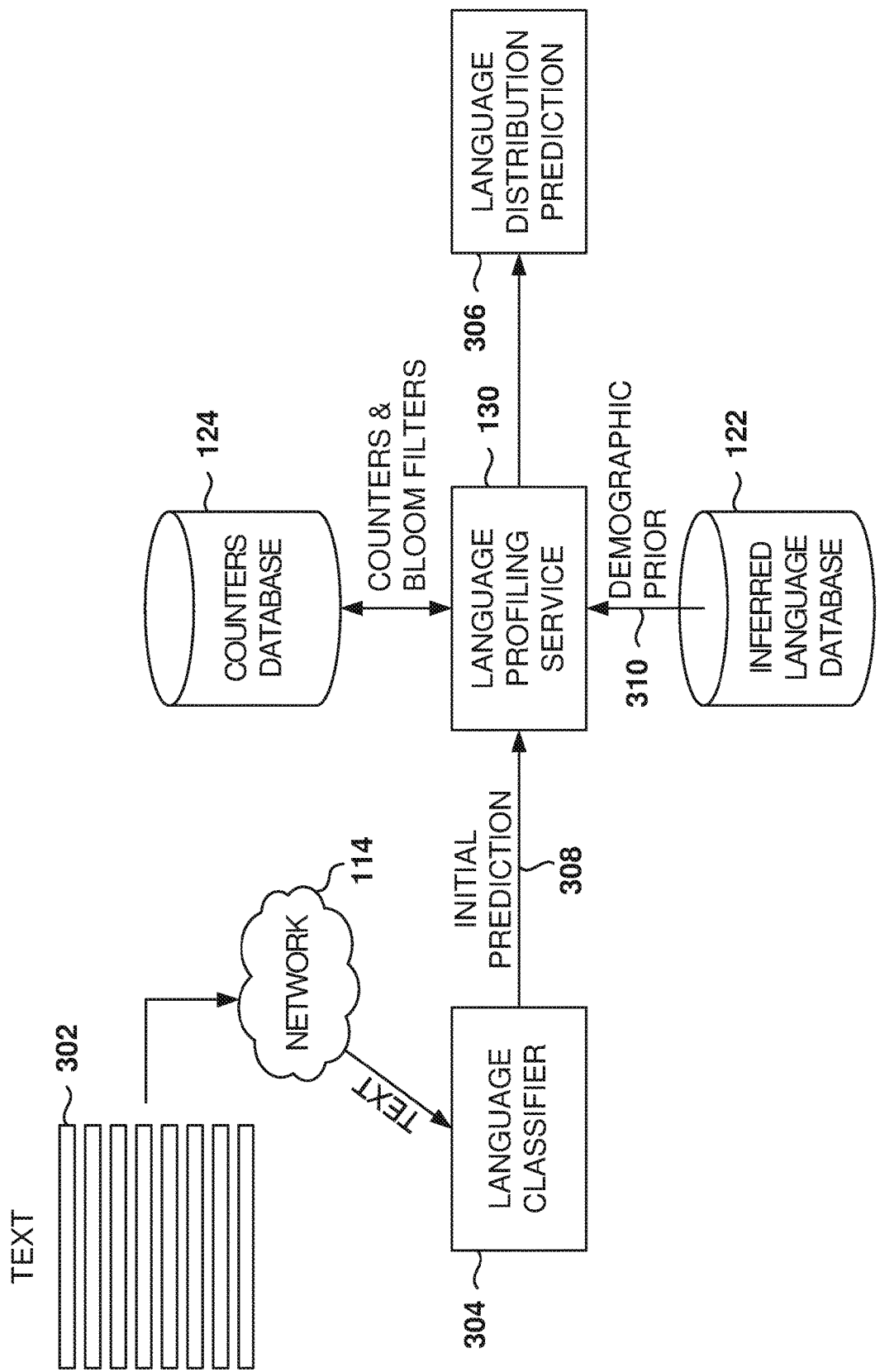
FIG. 3 illustrates the prediction of the language used in a text message, according to some example embodiments.

FIG. 3 illustrates the prediction of the language used in a text message, according to some example embodiments. As discussed above, the text message "y?" may mean "Why?" in English or "And?" in Spanish. If the online service knows that the message "y?" came from a user who has spoken only English in the past, has an English default locale, works in a British company, etc., then there is a very high probability that "y?" is intended as English.

However, for a bilingual user that speaks both Spanish and English, it is not easy to determine what is the intended language just based on user profile information. In this case, considering the more proximate context of the communication will assist in determining the intended language, such as considering the language being used in previous communications within a messaging conversation.

A text message, also referred to herein as a text string or simply a text 302, is received via the network 114 by the social networking server, and the text 302 is processed by a language classifier 304 (e.g., BasisTech, but other language classifiers may be used). The language classifier 304 generates an initial prediction 308 of the language in the text 302. The initial prediction 308 includes probabilities, for each supported language, that the text 302 is in the respective supported language. The initial prediction 308 is based on the text 302, without taking into consideration any information about the user or the context in which the text 302 was generated. The language classifiers (one per language) predict languages from text, such as probability of English, probability of Spanish, and so forth.

In some example embodiments, the language profiling service accesses demographic prior information 310 about the user that received the text 302. The demographic prior information 310 includes information about the user, such as the information kept in the user's profile, and includes one or more of the name of the client using the language profiling service 130, user identifier (ID), and a conversation ID. As used herein, client refers to the service within the social network that utilizes the language profiling service 1304 predicting the language spoken. For example, the client may be the user feed, the search engine, an advertisements engine, etc. The conversation ID is the identifier for a conversation that includes the user.

As used herein, a prior probability is a probability that is known in advance, before the calculation of a new probability (the posterior probability) based on additional information. For example, a prior probability of the text 302 being in English, for the user, is the probability that incoming text messages are written in English by the user, before considering the content of the text 302. The probability of English, given the text 302, is a posterior probability, or conditional probability, because the probability is calculated based on the evidence of the content of the text 302. Further, the demographic prior information 310 is the information known about the user before receiving the text 302 from the user.

The counters database 124 includes a plurality of counters associated with the use of languages by the users of the online service, such as the number of times each language was predicted for each user, for each time horizon (long, short, session), and for each client. In some example embodiments, the counters may be weighted by the language profiling service 130 when used for making language predictions. For example, an 80% probability of German would correspond to a 0.8 increase in the count.

In some example embodiments, bloom filters are used to ensure that content is not double-counted for any given user-client pair. Two bloom filters are used per user-client pair in a staggered "handoff" scheme such that each bloom filter is periodically cleared while the most recent half of the bloom filter items remain in the counters. In some example embodiments, the bloom filters are stored in the counters database 124.

After receiving the initial prediction 308, the language profiling service 130 retrieves the corresponding counters (and optionally the bloom filters) from the counters database 124. The relevant counters are for the given user-client pair and may also include counters for the conversation associated with the text 302. The language profiling service 130 updates the counters, when necessary, in the database 124 using the probabilities of the initial prediction 308. The language profiling service 130 checks the bloom filters to see if this text 302 has been seen before. If the text 302 has been seen before, then there is no update to the counters. If text 302 has not been seen before, the content is added to the bloom filter.

Further, the fetched demographic prior 310 provides a demographic prior over a user such as what languages the user knows based on their profile and other information.

The language profiling service 130 generates a language distribution prediction 306 based on the initial prediction, the retrieved counters, and the demographic prior 310, although some of the parameters are optional in some scenarios. The language distribution prediction 306 includes a probability, for each of the supported languages, that the text 302 is written in that language.

The language profiling service 130 improves the initial prediction 308 about the language of the text 302 by taking into consideration information about the user and the prior use of languages by the user. The language profiling service 130 uses prior information, such as the user's inferred spoken languages, to upgrade or downgrade the probability of a given language. For example, a given language may be removed from consideration (e.g., the probability will be zero or close to zero) if the language predicted by the language classifier 304 is not part of the languages spoken by the user. The language distribution prediction 306 is then returned to the requester, e.g., the client.

Figure 4:
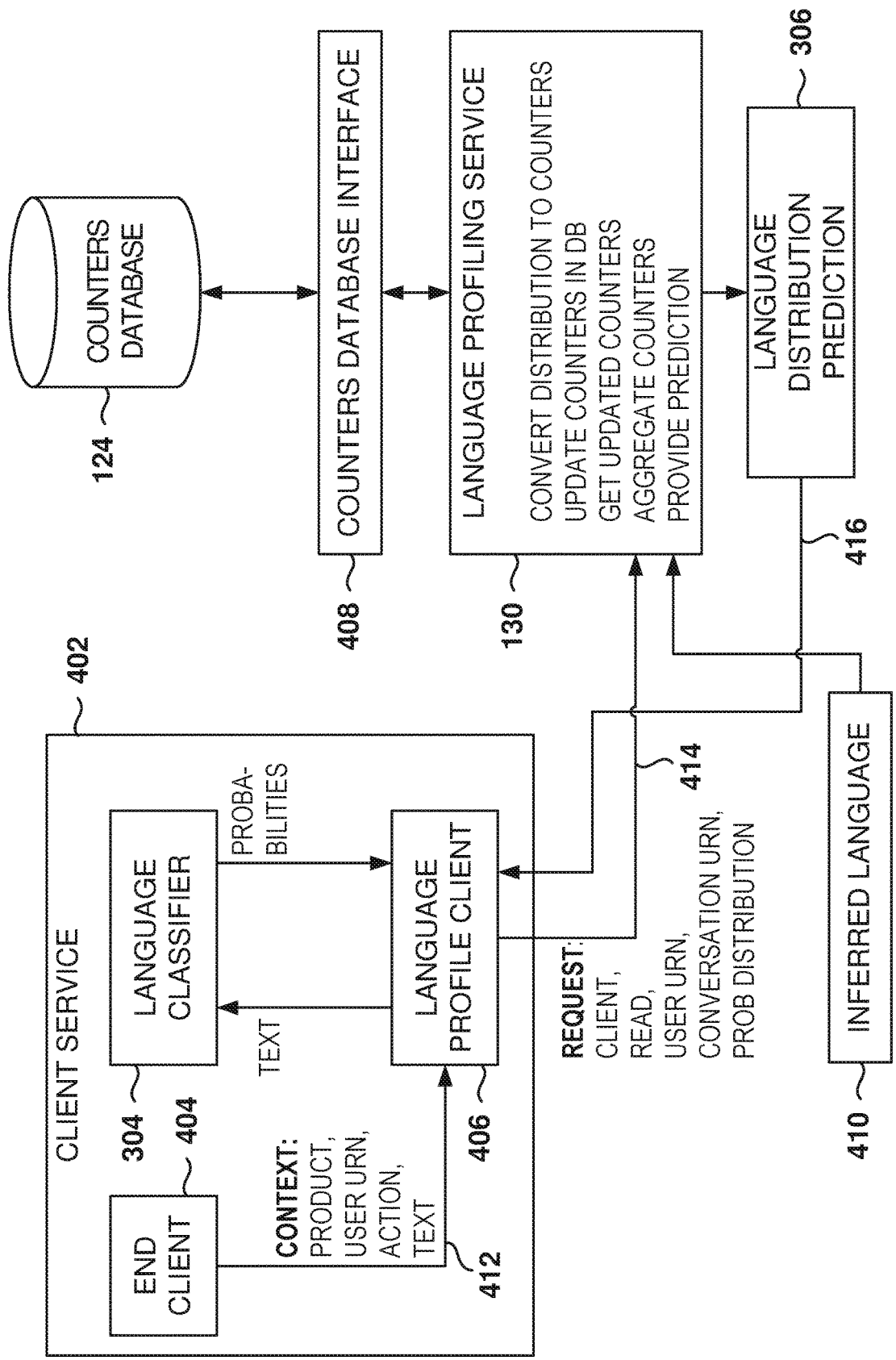
FIG. 4 is sample architecture for predicting the message language, according to some example embodiments.

FIG. 4 is sample architecture for predicting the message language, according to some example embodiments. The client service 402 sends a request to the language profiling service 130 for the language distribution prediction 306.

In some example embodiments, the client service 402 includes an end client 404 that generates the language requests. The client service 402 further includes a language classifier 304 that interacts with a language profile client 406, which is part of the language profiling service, such as an embedded application that is executed on the client service 402.

The end client 404 sends a request 412 to the language profile client 406, the request 412 being for the language distribution prediction 306. For example, the text may be generated by a user sharing a post, such as "Congratulations to my friend on her new job."

The request 412 includes context, such as a product identifier of the client service (that is originating the request, such as user feed, messaging), universal resource locator (URN) of the user (also known as the user ID), an action (e.g., reading or writing text), and a text to be analyzed for the user. The action, besides read and write, can also include other actions, such as when a user "likes" an item, shares, clicks on article, etc.

The language profile client 406 interacts with the language classifier 304 by sending the text to be analyzed and receiving the probabilities 416, for all the supported languages, that the text is in each language. In other example embodiments, the language classifier 304 may be outside the client service, such as within the language prediction service.

For example, the language classifier 304 may return that the text's probability of being in English is 0.5, in German is 0.3, and in Spanish is 0.2. After receiving the language probabilities on the language classifier 304, the language profile client 406 sends a request 414 to the language profiling service 130. The request 414 includes an identifier for the client, the type of operation (e.g., read), the user URN, a conversation URN (if applicable), and the probability distribution obtained from the language classifier 304. In some example embodiments, the language profiling service 130 is accessed via a JAVA Application Programming Interface (API), but other types of interfaces can be utilized.

It is noted that, in some example embodiments, the probability distributions are sent to the language profiling service 130, but the text is not sent. This provides for an added layer of user confidentiality by not sending the content of the message, which may include potentially private information.

Instead of just analyzing the content of the text, the language profiling service 130 supplement the analysis with data regarding information about the user and the prior use of language by the user. For example, how often has the user used different languages in the past when interacting with others in the online service. If the user has predominantly generated English messages in the past (as reflected in the user counters) but the language classifier 304 predicts that the user is talking Spanish with some probability of talking English, the language profiling service 130 can adjust the probability distributions to predict that English is more likely in the text than Spanish. This will make language classification more accurate by considering the information about the user, and not just the text.

The received probability distribution is used to update the counters in the counters database 124. The counters accrue information about language profiles of users by measuring the language use by the users. This information is used to better predict the languages that the user speaks (the inferred language 410) and the languages that the user prefers to use.

Demographic features about the user (e.g., information in the user profile) are also used by the language profiling service 130, in some example embodiments. The demographic features are particularly useful when there is not much information about the user in the user profile or because the user does not have much activity in the online service, as is the case for new users. In some example embodiments, the demographic features are not considered when the counters have been tracking the use of language by the user for a predetermined amount of time, such as six months or a year.

The counters track over time which languages received the top probability for this user. For example, as the user keeps sharing or texting, certain language will have a higher probability because most of the time people tend to share in one or two languages. For example, the counters track how often a given language was the most-probable language. In some example embodiments, the counters are kept for each of the supported languages (e.g., 24 supported languages, although fewer or more languages may be supported). Of course, most of the counters will have low values for most users because the majority of people speak one or two languages.

The counters are kept in the counters database 124, which is accessed by the language profiling service 130 via the counters database interface 408, e.g., an SQL interface, but any database interface may be used.

The counters are updated as the user participates in the online service and the counters record probabilities associated with the texts shared or read by the user. As time goes by, the language profiling service 130 will make deductions, such as, "when the user shares in the feed, the user shares in English," or, "when the user messages a friend, the user messages in Italian."

In some example embodiments, the inferred language 410 provides information on the languages spoken by the user. This information may be used to downgrade the impact of counters for certain languages. For example, if a user does not speak Japanese, then the counters for Japanese will not have a big impact in the determination of the language distribution predictions 306.

The inferred language 410 provides the information about the languages are spoken by the user, which is a prior probability used for the calculation of the language distribution predictions 306.

The counters database 124, in addition to keeping counters associated with a user, keeps counters associated with conversations between users. That is, one or more counters are kept for each conversation between two or more users (e.g., group chats).

The conversation may be in a messaging application but may also include conversations regarding to comments for a particular post in the feed. The conversation counters indicate the probability is that each language is being used in that conversation.

In some example embodiments, the language profiling service 130 operates online instead of off-line, although some calculations may be performed off-line. New evidence is incorporated into predictions almost immediately, such as updating counters. This is important in messaging, because the language has to be identified immediately and not processed off-line (e.g., within 24 hours), as many conversations are short-lived.

Figure 5:
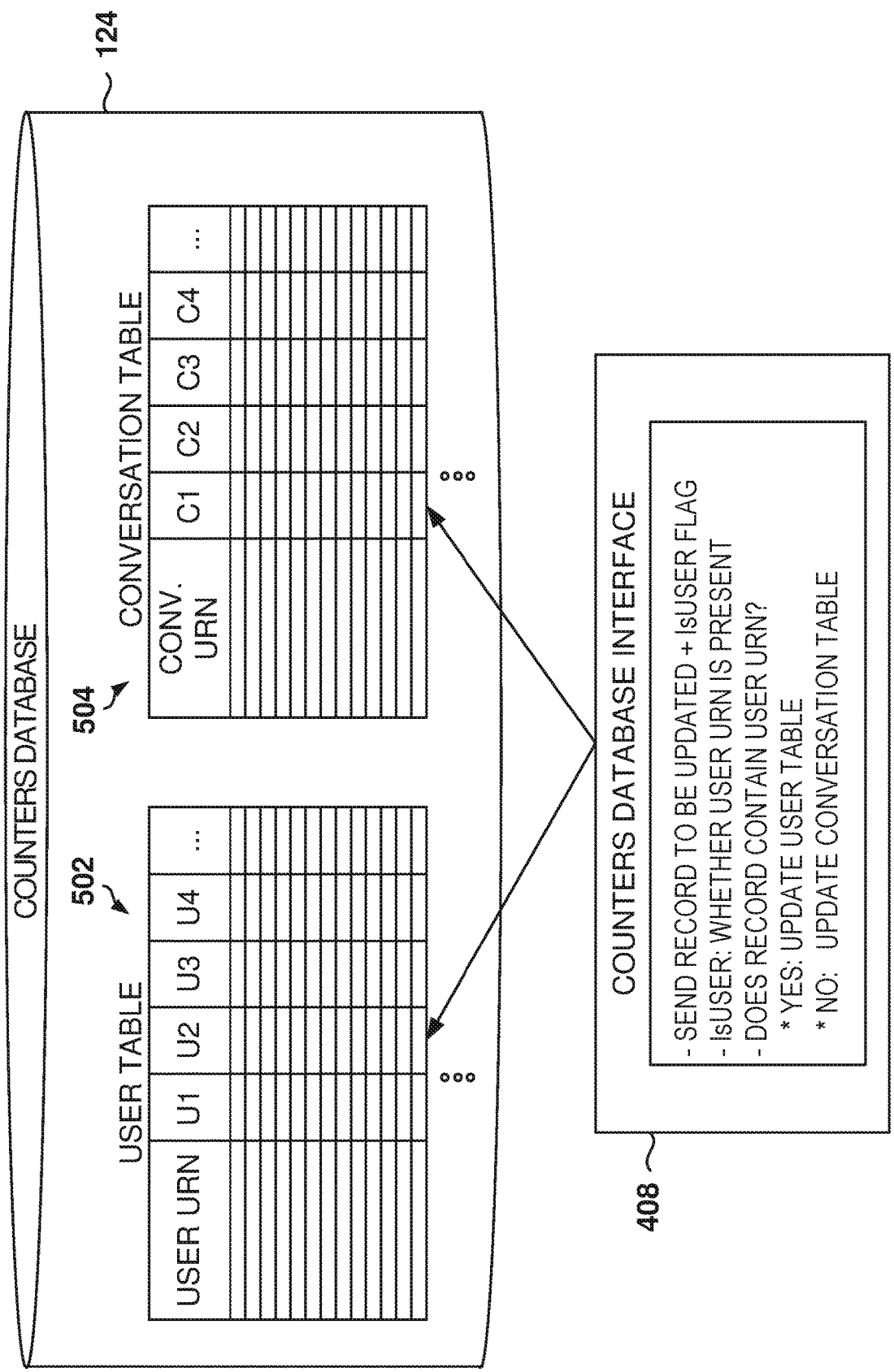
FIG. 5 shows the structure of the counters database, according to some example embodiments.

FIG. 5 shows the structure of the counters database, according to some example embodiments. The counters database 124 stores counters for users and conversations. The user counters are stored in a user table 502 and the conversation counters are kept in a conversation table 504.

The user table 502 includes an entry for each user (e.g., one row per user ID) and the conversation table 504 includes an entry for each conversation. Since the number of conversations may grow rapidly over time, a clean up process is performed periodically to eliminate entries for older conversations, e.g., conversations whose last activity is prior to a threshold time.

In some example embodiments, the counters are kept for a plurality of languages, and each counter includes low- and high-time decay values. More details about decay of counters are provided below with reference to FIG. 8.

Further, a counter is kept that is weighted by the square root of the text length and another one that is not weighted. In some example embodiments, four counters are kept per language. Thus, for 24 languages, four counters per language, two decay values, and two counters for weighting, the user table 502 includes 384 counters per row. Other embodiments may include fewer or additional counters per row. Each counter provides a different view of the user's language usage and provides additional information for the language profiling model.

In some interactions, both the user table 502 and the conversation table 504 are updated for the interaction of the user and the direction of the conversation (if available). In other interactions, the user table 502 or the conversation table 504 is updated.

If the language profiling server receives the user URN, then the user table 502 is updated, but if there is no user URN, then there is no update. Similarly, if the conversation URN is provided, the conversation table 504 is updated.

In some example embodiments, the counters database interface 408 uses a single Post request to update the counters in the records with the updated counters are returned to the requester. By using one request to update and return values, the database is more efficient, instead of having to do two calls: one for the update and one for the data.

Thus, a request is sent with the record to be updated and a flag IsUser that indicates if the user URN is present in the request. If the user URN is present, then the user table 502 is updated and if the user URN is not present, then the conversation table 504 is updated.

It is noted that the embodiments illustrated in FIG. 5 are examples and do not describe every possible embodiment. Other embodiments may utilize different tables, combine the tables into a single table, etc. The embodiments illustrated in FIG. 5 should therefore not be interpreted to be exclusive or limiting, but rather illustrative.

FIG. 6 illustrates an example user table 502, according to some example embodiments. Each entry includes four counters: Top-Ranked-Count, Probability-Sum, Log-Probability-Sum, and Reciprocal-Rank-Sum. Although this example is illustrated for three languages—English, Spanish, and Chinese—other embodiments may have additional languages and additional counters.

The Top-Ranked-Count indicates how many times this language was the top prediction (by the language classifier) for the text, e.g., the language was the most probable from all the languages.

The Probability-Sum is the sum of probabilities for this language across all predictions made in the past. For example, if there are two language distributions for a text, one which gives English 0.2, and one which gives English 0.5, the Probability-Sum counter is 0.7. And as new text is seen by the language classifier, new predictions are made, and the Probability-Sum counter will continue to add up.

The Log-Probability-Sum is the sum of log probabilities for this language across all predictions, which is equivalent to the product of all probabilities across all predictions. The Log-Probability-Sum counter is similar to the Probability-Sum counter, except that is the log of the sum. In some example embodiments, the Log-Probability-Sum has a floor value of 0.001.

The Reciprocal-Rank-Sum counter is the sum of the inverse of the rank of the language (e.g., 1/Rank(language)) across all predictions. The Reciprocal-Rank-Sum counter is calculated by taking the inverse of the Reciprocal-Rank of each language in the list of predictions, and then adding the calculated inverse values. The Reciprocal-Rank-Sum counter is a way of keeping track of where a language is relatively to other languages. One important factor is the ranking of the language compared to other languages. Taking the inverse means that if a language is ranked one, the inverse is one. If a language is ranked third, the score is one divided by three. Thus, languages ranked higher get better scores.

The counters provide insight that improves over time; the more information evaluated, the better insight the counters provide for making predictions. For example, if the user keeps posting in Spanish, the language profiling service will eventually provide a higher probability for Spanish than other languages, such as Italian or Portuguese, even though a single one-time prediction may be error-prone and predict Italian.

In some example embodiments, a statistical model is developed using social network features (e.g., user profile information) and the counters. More details are provided below with reference to FIG. 9 regarding the use of a machine-learning model for predicting the language distributions.

In other example embodiments, heuristic models are utilized based on the value of the counters, the probability distributions generated by the language classifier 304, and the inferred language 410. More details regarding the use of heuristics for generating the language distribution prediction 306 are provided below with reference to FIG. 7.

Figure 7:
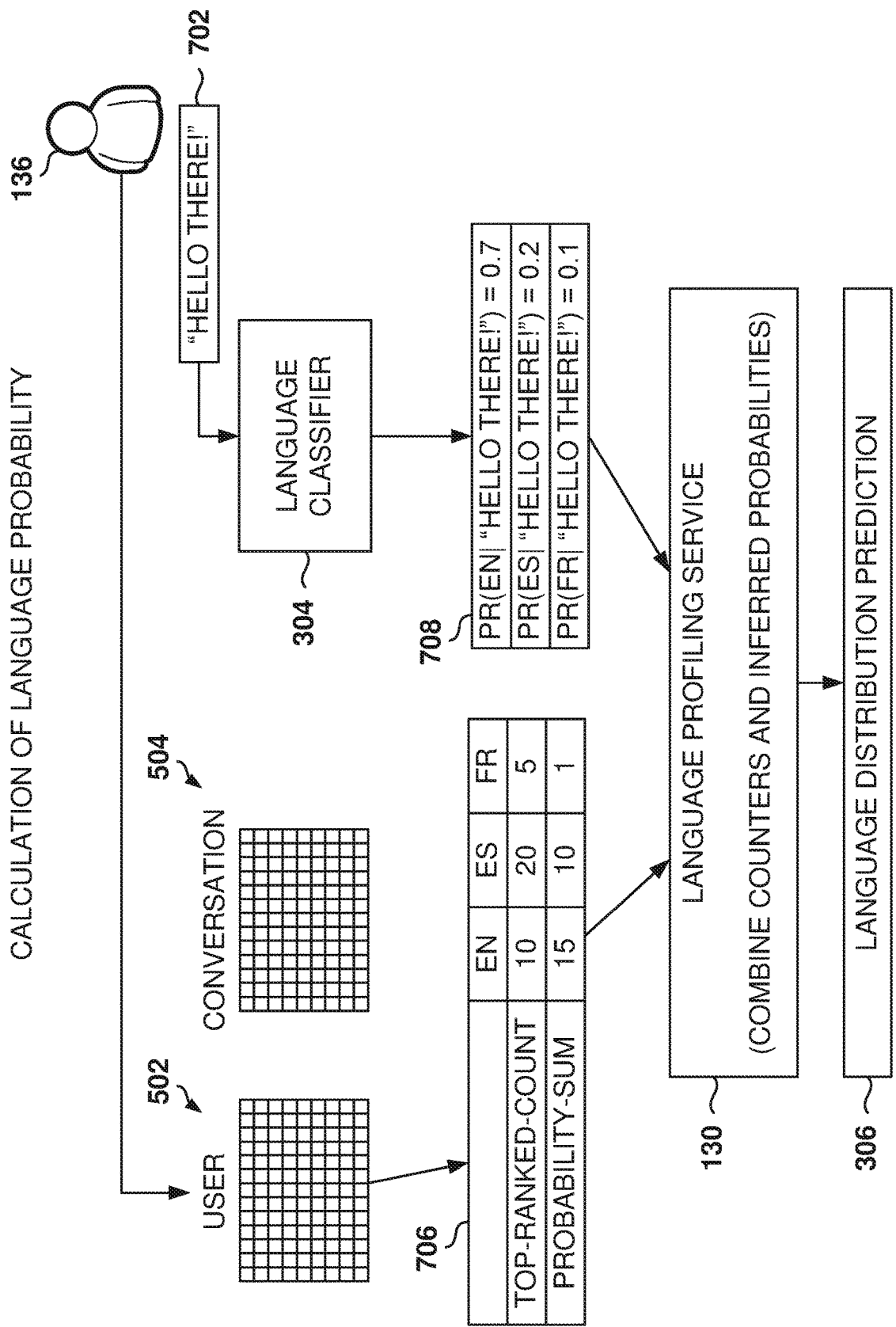
FIG. 7 illustrates the calculation of the language probability, according to some example embodiments.

FIG. 7 illustrates the calculation of the language probability, according to some example embodiments. Heuristic methods are used to determine the language probabilities. For example, add all the counters for one user with respective weights, and the sums for all the languages are compared to determine the probabilities. In some example embodiments, for each language, a weighted sum of the counters is calculated for evaluation.

A text 702 with the content "Hello there!" is sent to the language classifier that identifies probabilities for the languages of 0.7 for English, 0.2 for Spanish, and 0.1 for friends.

In the example illustrated in FIG. 7, two counters are used (Top-Ranked-Count and Probability-Sum) for three languages (English (EN), Spanish (ES), and French (FR)). The counters in user table 706 (for user 136) have values of 10, 20, and 5 for Top-Ranked-Count, and 15, 10, and 1 for Probability-Sum.

In some example embodiments, the values of the counters may be weighted using predefined weights, which may be tuned over time to improve language predictability. In this example, a weight of 2 is assigned to Top-Ranked-Count and a weight of 1 to Probability-Sum.

The weighted sum of the counters then produces values of 35 for English, 50 for Spanish, and 11 for French. These values may be normalized by dividing them by the total of 96, resulting in 0.36, 0.52, and 0.11. This is the prior distribution for the user, without the consideration of the language classifier probabilities 708. This prior distribution of probabilities indicates the probability that the next text from the user will be in the respective language.

In some example embodiments, the language profiling service 130 combines the counter value 706 and the language classifier value 708 performing an arithmetic calculation to combine them. In some example embodiments, the counter value 706 and the language classifier value 708 are multiplying together to obtain the probabilities of the language distribution prediction, which would be 0.25, 0.10, and 0.1. Therefore, the most probable language is English. Further, these probabilities may be normalized by dividing by the total. These values (whether they are normalized or not) are the language distribution prediction 306.

It is noted, that in other example embodiments, the inferred language, that indicates the probability that the language is spoken by the user, is also considered in the heuristic method for calculating the language distribution prediction. For example, the probabilities of the inferred language are multiplied by 5 and then added to the values previously calculated. Other values for the inferred-languages weights may also be used.

Further, if there is a conversation, the values of the conversation counters may we summed with different weights and the results combined with the results from the user counters, the language classifier 304, and the inferred language.

Further, in some example embodiments, thresholds may be used, such that if a value does not meet the threshold, the probability for that language is set to zero. For example, if the probability that the text 702 is in Chinese is 0.001 and the threshold is 0.1, then the language distribution prediction would have a zero for Chinese.

In some example embodiments, the inferred language for the user is used as long as the counters are below a certain threshold. After the counters reached the threshold, the inferred language information is not used because as the system accrues values for the counters, there is no need to pay as much attention to the profile information, as the counters keep track of the activities of the user and how the user uses languages.

In some example embodiments, the conditional probability of the language given the text and user P(language|text, user) is calculated. Assuming conditional independence of the text and the user given the language (which is a useful approximation although minor be completely exact because users have their own idiosyncratic writing styles), then it is possible to calculate the following:

$$P(\text{text,user}|\text{language})=P(\text{text}|\text{language})*P(\text{user}|\text{language})$$

Assuming a uniform prior over the languages (P(language)=1|number of languages), it can be shown the following:

P(language|text,user)~P(language|text)*P(language|user)

P(language|text) is the probability provided by the language classifier, and P(language|user) is the probability calculated based on the counters for the user.

It should also be noted that the calculation of P(language|user) or a particular user is not limited to using only the counters corresponding to that user. For example, a calculation for Smart Replies could leverage observations from the user feed. If it is known, however, that the utterance "y?" came from a user who has spoken only English in the past, has an English default locale, works in a British company, and has high score for inferred language "English," there is strong evidence that "y?" is, in fact, intended as English.

Figure 8:
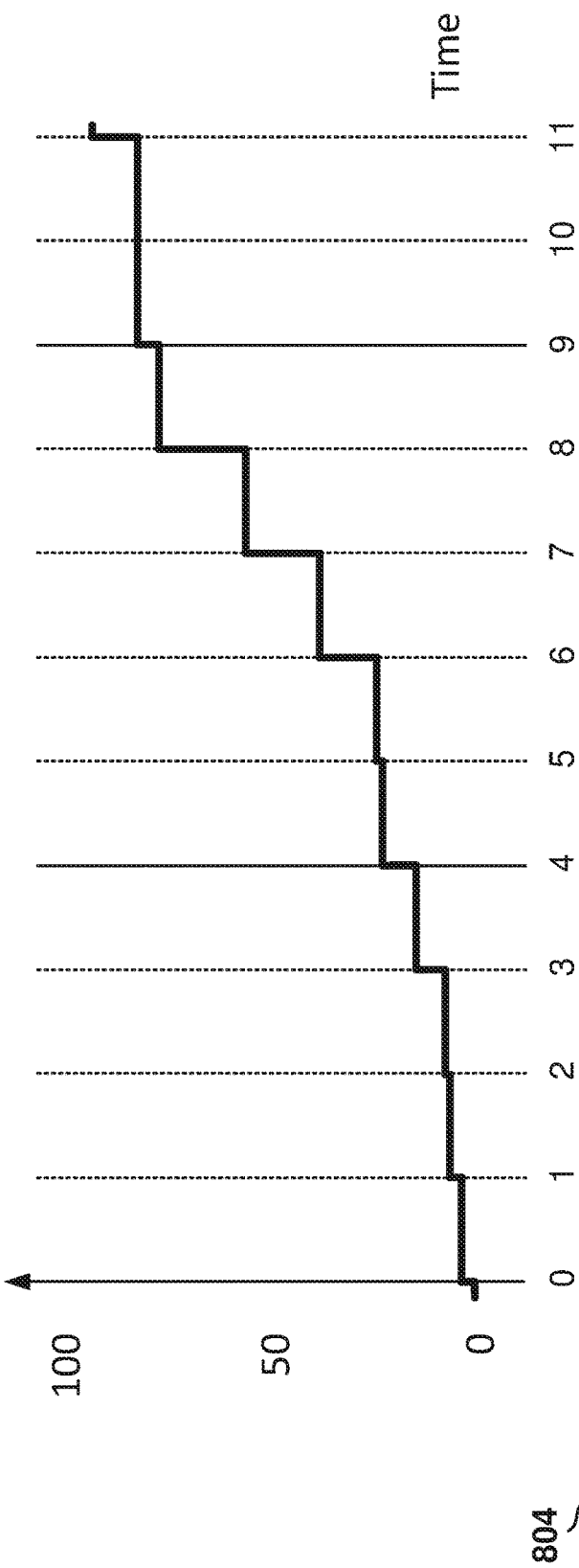
FIG. 8 illustrates the evolution of a counter with discounting of older values, according to some example embodiments.

FIG. 8 illustrates the evolution of the body of the counter with discounting of older values, according to some example embodiments. If a user utilizes English all the time while interacting with the online service, it can be deduced that the next interaction will most likely be in English. However, there are multilingual users that may interact in multiple languages and the system has to account for the possibility of interactions in multiple languages.

Some solutions analyze user profile data to determine the languages spoken by the user, such as places where the user has lived or studied, and the like. But this approach has its shortcomings. For example, if the user has studied English while living in Germany, it may be difficult to determine that the user speaks English. Also, a user may have lived abroad (e.g., study abroad) for a while but still may not have mastered the language spoken in the foreign country.

Further, a multilingual user may not be interested in interactions in a certain language. For example, the user may only want to read articles in English. By analyzing the interaction patterns of the user, it can be determined that the user is not interested in articles in other languages. Maybe the user was interested in articles in French five years earlier before a trip to France, but the user is not interested anymore. By using counters with time discounting, the service determines the interest of the user when it relates to one or more languages.

A counter with time discounting may be implemented by updating the counter based on the timed entries. For example, a counter was incremented by five six periods earlier (e.g., six months ago), and now the counter is being incremented by one. In this approach, the counter would be read and the value of the counter reduced based on the time passed (e.g., $5 \times 0.95^6$) and then incremented by two. The result is then stored back on the database to update the counter. The problem with this approach is that it requires keeping track of time and updating the counter, which requires both read and write database operations. For a system with thousands or millions of counters, accessing the database twice may tax the system resources.

Embodiments presented herein present counters with time discounting that do not require logging the times when the counter was updated, and updating the counters requires a single database operation.

In some example embodiments, a value to be added va to the counter is received at time t. First, the time period T for time t is calculated as follows:

$$T = (t - t_0) \bmod P \quad (1)$$

Here, $t_0$ is a time origin and P determines the duration of a period (e.g., day, week, month, year). Further, a discounting factor k is used to lower the effect of older increments of the counter. The following equation is used to calculate va at time t.

$$va = \frac{n}{(1-k)^T} \quad (2)$$

The discount factor k is greater than 0 and less than 1. Therefore, va will be greater than n after the first period. Although it was said that the discount factor is used to lower the effect of older increments, in reality, the newer increments to the counter are inflated and they are inflated more and more as time goes by. This provides the same effect as discounting older updates.

Additionally, a promotion factor pf(T) for each period is defined as the multiplier of n for calculating the va. The promotion factor pf(T) is based on the discount factor k and the time period T as follows:

$$pf(T) = \frac{1}{(1-k)^T} \quad (3)$$

Thus, the new updates are inflated based on the promotion factor. Equation (2) may be rewritten as follows:

$$va = n \times pf(T) \quad (4)$$

In some example embodiments, the counters utilize the same time origin $t_0$. Therefore, the pf(T) is calculated once for the current period and all the counters will use the same promotion factor pf(T) during that period.

The example illustrated in FIG. 8 shows a table 804 with values to be added on the first row at different time periods shown above the table 804. In this example, the promotion factor is 1.1. The second row of table 304 shows the values of pf(T) over time, that is, pf(0), pf(1), pf(2), pf(3), etc., which are equal to $1.1^0$, $1.1^1$, $1.1^2$, $1.2^3$, etc., or 1, 1.1, 1.21, 1.33, etc.

The actual value added va is shown on the third row and is calculated by multiplying n in the first row times pf(T) in the second row. The last row shows the value of the counter after adding va. This value is then added to the counter value of the database in a single database-access operation (e.g., add (counter c, va)). A read operation of the counter is not required to update the value of the counter.

A chart 802 illustrates the evolution of the counter over time. It can be observed that, as times go by, the increments have a bigger effect on the counter. For example, at periods 0 and 9, the same value of 2 is to be added. However, at period 0 the va is 2, while at period 9 the va is 4.72.

It is noted that using counters with time discounting, as described above, does not require storing times when the counters were updated previously, such as the last time that the counter was updated. Using the pf that varies over time provides an embedded mechanism for controlling the value of updates over time.

Besides the exponential evolution of pf(T), as shown in equation (3), other embodiments may utilize equations, such as a linear evolution, logarithmic evolution, polynomial evolution, and the like, or a combination thereof. Here are examples of other possible equations for calculating pf(T):

$$pf(T) = a \times T, \text{ where } a > 1 \quad (5)$$

$$pf(T) = a \times T^3 + b \times T^2 + c \times T \quad (6)$$

$$pf(T) = 1 + (\log(T)) \quad (7)$$

$$pf(T) = 1/(1-k)^{T/3} \quad (8)$$

$$pf(T) = a \times T + b^{T/2} \quad (9)$$

Thus, the embodiments illustrated in FIG. 8 should therefore not be interpreted to be exclusive or limiting, but rather illustrative.

The language profiling service enable a more accurate language detection on short text as well as arrive at a language "profile" of a user by keeping track of language probabilities returned by language detection software over time and combining that information with a demographic prior over each user and context (feed, search, etc.). The language profiling service generates more accurate prediction of the languages users tends to use in a given context, e.g., a user may tend to share in feed in English but message with connections in Spanish.

Language detection alone is not able to arrive at such precise characterization due to inherent ambiguity of short text ("si" can mean "yes" in Spanish and Italian). In contrast, the present embodiments enable ruling out Italian if it is known that the user knows only Spanish. The language profiling service overcomes such limitations of language detection by aggregating language probability counters over time within given contexts of interaction (feed, search) as well as integrating linguistic prior over users based on inferred language and other demographic information.

Figure 9:
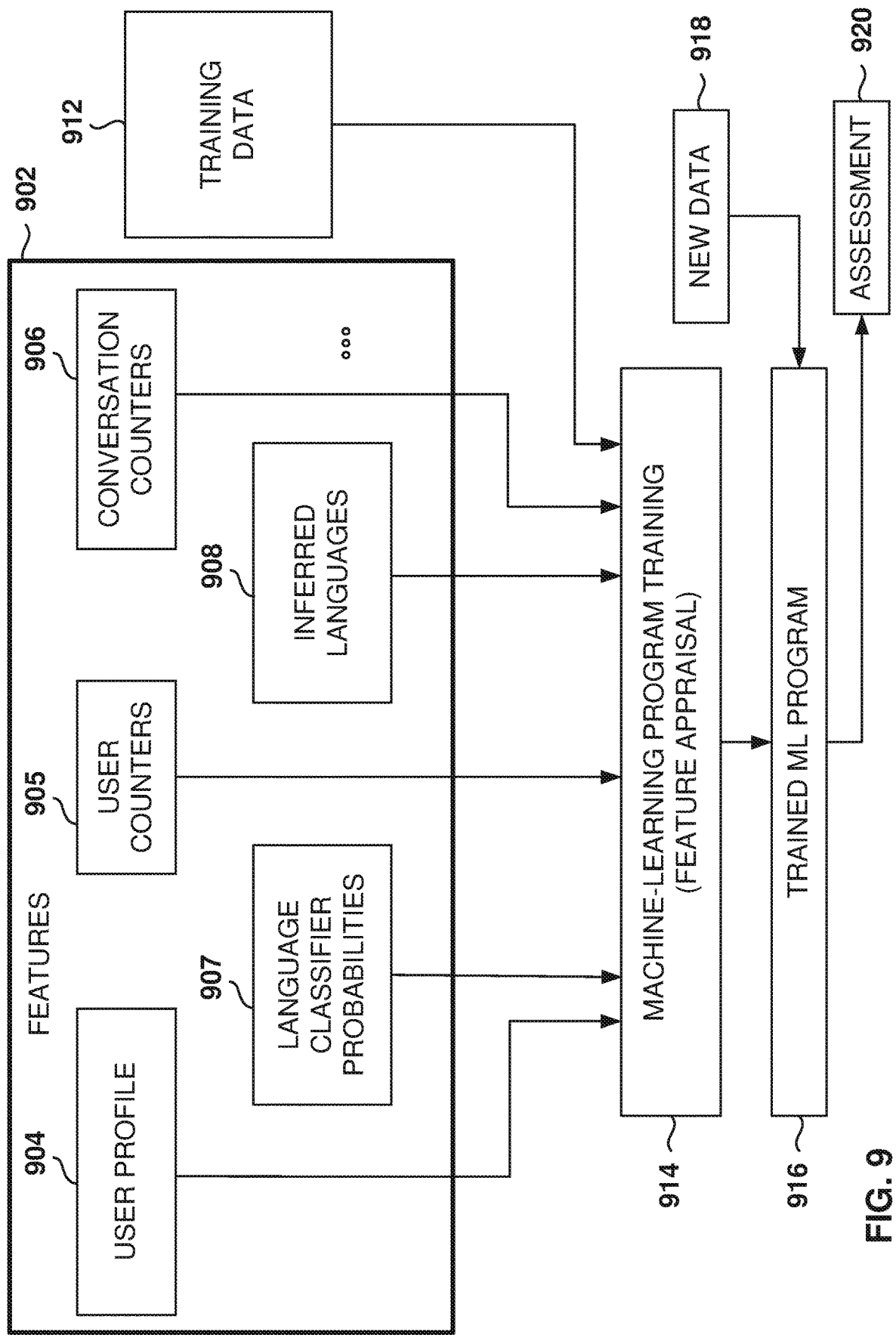
FIG. 9 illustrates the training and use of a machine-learning program, according to some example embodiments.

FIG. 9 illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 712 in order to make data-driven predictions or decisions expressed as outputs or assessments 720. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), deep neural networks (DNN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms utilize the training data 912 to find correlations among identified features 902 that affect the outcome.

The machine-learning algorithms utilize features for analyzing the data to generate assessments 920. A feature 902 is an individual measurable property of a phenomenon being observed. The concept of feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In some example embodiments, the language counters are used as features in the machine-learning model to infer language distribution probabilities. In one example embodiment, the features 902 may be of different types and may include one or more of user profile 904, user counters 905, conversation counters 906, language classifier probabilities 907, and inferred languages probabilities 908. The features 902 may include all or part of the social network data 614. The data sources include user standardized data, jobs standardized data, user connections, user employment preferences, job views, job applied, job information, salary information, etc.

The machine-learning algorithms utilize the training data 912 to find correlations among the identified features 902 that affect the outcome or assessment 920. In some example embodiments, the training data 912 includes known data for one or more identified features 902 and one or more outcomes, such as the employment type (field or full-time-corporate).

In some example embodiments, the training data 912 may include information about the languages spoken by the user. In some instances, some users may be surveyed to ask about the languages they speak, and this information is added to the training data 912.

With the training data 912 and the identified features 902, the machine-learning tool is trained at operation 914. The machine-learning tool appraises the value of the features 902 as they correlate to the training data 912. The result of the training is the trained machine-learning program 916.

When the machine-learning program 916 is used to perform an assessment, new data 918 is provided as an input to the trained machine-learning program 916, and the machine-learning program 916 generates the assessment 920 as output. For example, the machine-learning program may be used to provide the language probability distributions for a given text and user.

In some example embodiments, part of the data (e.g., 90%) is used to train the machine-learning program and the rest is reserved for testing and validation. In some example embodiments, the model output is evaluated sampling results and manually validating these results. The results may be evaluated by human judges or may be evaluated by asking users of the social network directly to confirm the validity of the predictions, or by asking the employers to confirm the predictions for the given title or titles. By evaluating the sample results, it is possible to determine the accuracy of the predictions by the model.

Figure 10:
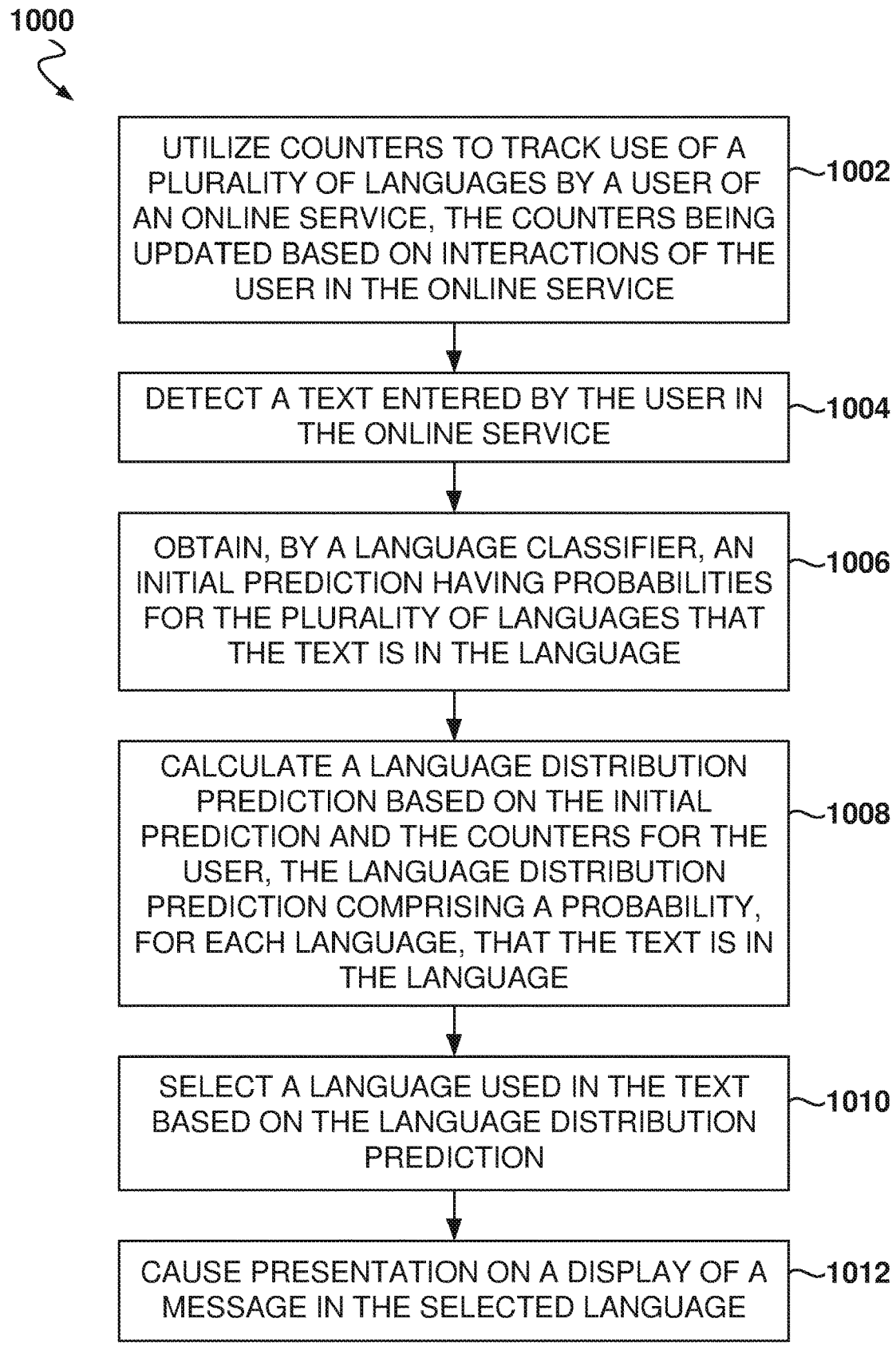
FIG. 10 is a flowchart of a method for estimating the language used in a user communication, according to some example embodiments.

FIG. 10 is a flowchart of a method 1000 for estimating the language used in a user communication, according to some example embodiments. While the various operations in this flowchart are presented and described sequentially, one of ordinary skill will appreciate that some or all of the operations may be executed in a different order, be combined or omitted, or be executed in parallel.

At operation 1002, one or more processors utilize counters to track use of a plurality of languages by a user of an online service, the counters being updated based on interactions of the user in the online service.

From operation 1002, the method 1000 flows to operation 1004 for detecting, by the one or more processors, a text entered by the user in the online service.

At operation 1006, a language classifier obtains an initial prediction having probabilities for the plurality of languages that the text is in the language.

From operation 1006, the method 1000 flows to operation 1008, where the one or more processors calculate a language distribution prediction based on the initial prediction and the counters for the user. The language distribution prediction comprises a probability, for each language, that the text is in the language.

From operation 1008, the method 1000 flows to operation 1010 for selecting, by the one or more processors, a language used in the text based on the language distribution prediction.

At operation 1012, the one or more processors cause presentation on a display of a message in the selected language.

In one example, calculating the language distribution prediction further comprises for each language, calculating a weighted sum of the counters of the user; and for each language, multiplying the weighted sum of the counters by the initial prediction.

In one example, calculating the language distribution prediction further comprises utilizing a machine-learning model to calculate the probability for each language that the text is in the language, the machine-learning model include features that comprise the counters, values of the initial prediction, and information about the user, the machine-learning model being trained based on past interactions on the online service by users of the online service.

In one example, the method 1000 further comprises obtaining, for each language, and inferred language probability that indicates a probability that the user speaks that language, where calculating the language distribution prediction comprises using the inferred language probability of the plurality of languages for the calculating.

In one example, the counters comprise user counters associated with interactions of the user and conversation counters associated with conversations in the online service.

In one example, the counters comprise for each user and for each language a Top-Ranked-Count indicating how many times the language was a top prediction among all language predictions; a Probability-Sum that is a sum of probabilities for the language across all the language predictions; a Log-Probability-Sum that is a sum of log probabilities for the language across all the language predictions; and a Reciprocal-Rank-Sum that is a sum of an inverse of a rank of the language across all the language predictions.

In one example, utilizing the counters further comprises applying discounting to each counter based on a time of updating the counter.

In one example, the message in the selected language includes one or more smart replies suggested to the user for responding to a communication in the online service.

In one example, the method 1000 further comprises storing the counters in a counters database, the counters database comprising a user table for storing counters by user and a conversation table for storing counters by conversation.

In one example, the user table includes an entry for each user, the entry for each user comprising counters for each of the plurality of languages.

Another general aspect is for a system that includes a memory comprising instructions and one or more computer processors. The instructions, when executed by the one or more computer processors, cause the one or more computer processors to perform operations comprising: utilizing, by the one or more processors, counters to track use of a plurality of languages by a user of an online service, the counters being updated based on interactions of the user in the online service; detecting, by the one or more processors, a text entered by the user in the online service; obtaining, by a language classifier using the one or more processors, an initial prediction having probabilities for the plurality of languages that the text is in the language; calculating, by the one or more processors, a language distribution prediction based on the initial prediction and the counters for the user, the language distribution prediction comprising a probability, for each language, that the text is in the language; selecting, by the one or more processors, a language used in the text based on the language distribution prediction; and causing, by the one or more processors, presentation on a display of a message in the selected language.

In yet another general aspect, a machine-readable storage medium (e.g., a non-transitory storage medium) includes instructions that, when executed by a machine, cause the machine to perform operations comprising: utilizing, by one or more processors, counters to track use of a plurality of languages by a user of an online service, the counters being updated based on interactions of the user in the online service; detecting, by the one or more processors, a text entered by the user in the online service; obtaining, by a language classifier using the one or more processors, an initial prediction having probabilities for the plurality of languages that the text is in the language; calculating, by the one or more processors, a language distribution prediction based on the initial prediction and the counters for the user, the language distribution prediction comprising a probability, for each language, that the text is in the language; selecting, by the one or more processors, a language used in the text based on the language distribution prediction; and causing, by the one or more processors, presentation on a display of a message in the selected language.

Figure 11:
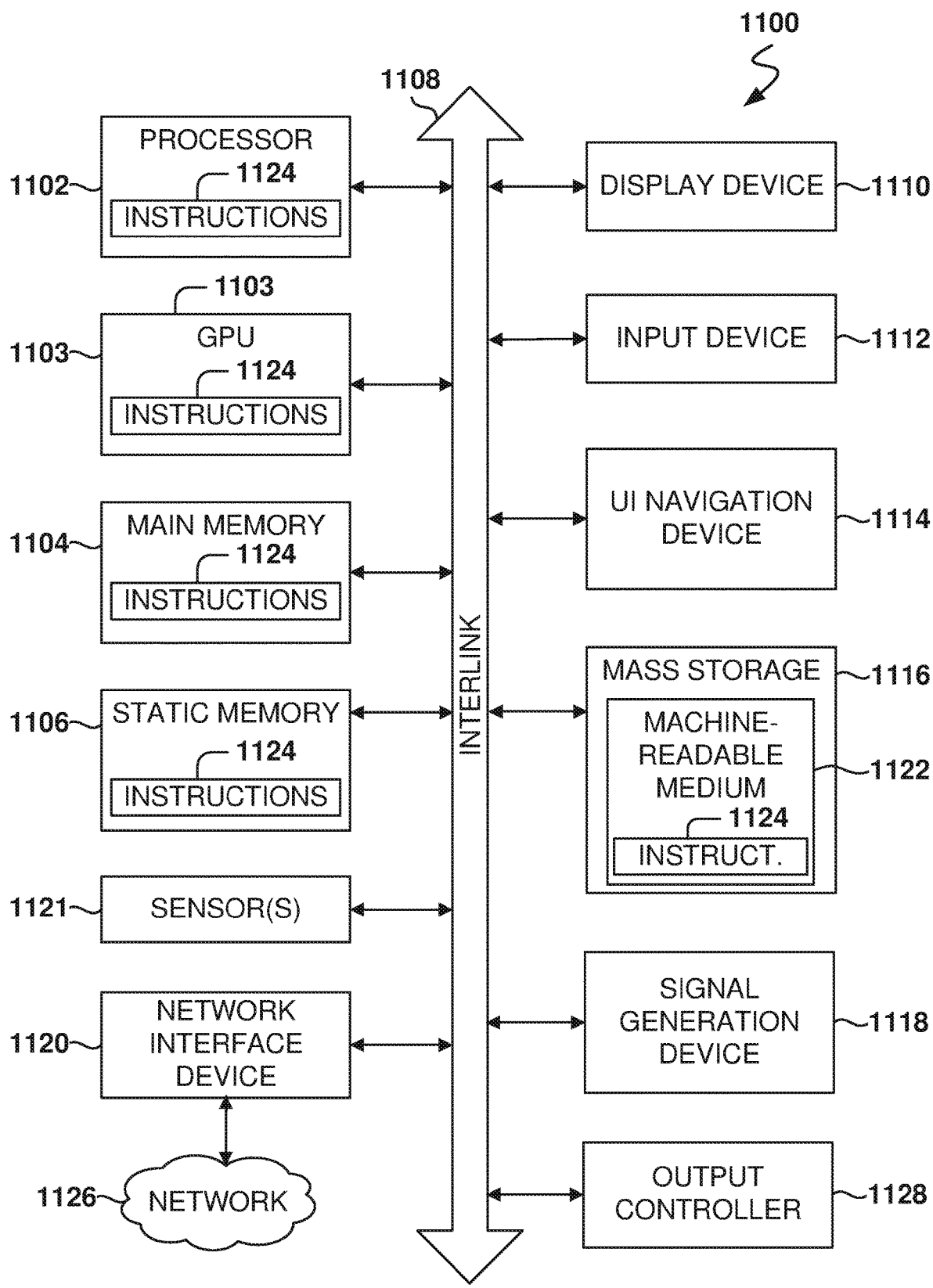
FIG. 11 is a block diagram illustrating an example of a machine upon or by which one or more example process embodiments described herein may be implemented or controlled.

FIG. 11 is a block diagram illustrating an example of a machine 1100 upon or by which one or more example process embodiments described herein may be implemented or controlled. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in a peer-to-peer (P2P) (or other distributed) network environment. Further, while only a single machine 1100 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one user of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1100 may include a hardware processor 1102 (e.g., a central processing unit (CPU), a hardware processor core, or any combination thereof), a graphics processing unit (GPU) 1103, a main memory 1104, and a static memory 1106, some or all of which may communicate with each other via an interlink (e.g., bus) 1108. The machine 1100 may further include a display device 1110, an alphanumeric input device 1112 (e.g., a keyboard), and a user interface (UI) navigation device 1114 (e.g., a mouse). In an example, the display device 1110, alphanumeric input device 1112, and UI navigation device 1114 may be a touch screen display. The machine 1100 may additionally include a mass storage device (e.g., drive unit) 1116, a signal generation device 1118 (e.g., a speaker), a network interface device 1120, and one or more sensors 1121, such as a Global Positioning System (GPS) sensor, compass, accelerometer, or another sensor. The machine 1100 may include an output controller 1128, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1116 may include a machine-readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, within the hardware processor 1102, or within the GPU 1103 during execution thereof by the machine 1100. In an example, one or any combination of the hardware processor 1102, the GPU 1103, the main memory 1104, the static memory 1106, or the mass storage device 1116 may constitute machine-readable media.

While the machine-readable medium 1122 is illustrated as a single medium, the term "machine-readable medium" may include a single medium, or multiple media, (e.g., a centralized or distributed database, and/or associated caches and servers) configured to store the one or more instructions 1124.

The term "machine-readable medium" may include any medium that is capable of storing, encoding, or carrying instructions 1124 for execution by the machine 1100 and that cause the machine 1100 to perform any one or more of the techniques of the present disclosure, or that is capable of storing, encoding, or carrying data structures used by or associated with such instructions 1124. Non-limiting machine-readable medium examples may include solid-state memories, and optical and magnetic media. In an example, a massed machine-readable medium comprises a machine-readable medium 1122 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
for each language in a plurality of languages, utilizing, by one or more processors, a plurality of counters to log use of the language by a user of an online service, the plurality of counters for each language including at least a first counter for logging a Top-Ranked-Count, indicating how many times the language was a top prediction among all language predictions, and a second counter for logging a Probability-Sum, indicating the sum of probabilities for the language across all the language predictions, the plurality of counters being updated based on detecting interactions of the user via the online service;

for each language in the plurality of languages, calculating a weighted sum of the values of the plurality of counters, for the user;
detecting, by the one or more processors, a text entered by the user in the online service;
obtaining, by a language classifier using the one or more processors, an initial prediction having probabilities for the plurality of languages that the text is in the language;
calculating, by the one or more processors, a language distribution prediction based on the initial prediction and the weighted sum of the counters for each language for the user by multiplying the initial prediction by the weighted sum of the counters, the language distribution prediction comprising a probability, for each language, that the text is in the language;
selecting, by the one or more processors, a language used in the text based on the language distribution prediction; and
causing, by the one or more processors, presentation on a display of a message in the selected language.

2. The method as recited in claim 1, wherein calculating the language distribution prediction further comprises:
utilizing a machine-learning model to calculate the probability for each language that the text is in the language, the machine-learning model receiving, as input, features that comprise the counters, values of the initial prediction, and information about the user, the machine-learning model being trained based on past interactions on the online service by users of the online service.

3. The method as recited in claim 1, further comprising:
obtaining, for each language, an inferred language probability that indicates a probability that the user speaks that language, wherein calculating the language distribution prediction comprises using the inferred language probability of the plurality of languages for the calculating.

4. The method as recited in claim 1, wherein the plurality of counters for each language comprise user counters associated with interactions of the user and conversation counters associated with conversations in the online service.

5. The method as recited in claim 1, wherein the plurality of counters comprise for each user and for each language:
a third counter indicating a Log-Probability-Sum that is a sum of log probabilities for the language across all the language predictions; and
a fourth counter a Reciprocal-Rank-Sum that is a sum of an inverse of a rank of the language across all the language predictions.

6. The method as recited in claim 1, wherein utilizing the plurality of counters further comprises:
applying discounting to each counter based on a time of updating the counter.

7. The method as recited in claim 1, wherein the message in the selected language includes one or more smart replies suggested to the user for responding to a communication in the online service.

8. The method as recited in claim 1, further comprising:
storing the plurality of counters in a counters database, the counters database comprising a user table for storing counters by user and a conversation table for storing counters by conversation.

9. The method as recited in claim 8, wherein the user table includes an entry for each user, the entry for each user comprising counters for each of the plurality of languages.

10. A system comprising:
a memory comprising instructions; and
one or more processors, wherein the instructions, when executed by the one or more processors, cause the system to perform operations comprising:
for each language in a plurality of languages, utilizing, by the one or more processors, a plurality of counters to log use of the language by a user of an online service, the plurality of counters for each language including at least a first counter for logging a Top-Ranked-Count, indicating how many times the language was a top prediction among all language predictions, and a second counter for logging a Probability-Sum, indicating the sum of probabilities for the language across all the language predictions, the plurality of counters being updated based on detecting interactions of the user in the online service;
for each language in the plurality of languages, calculating a weighted sum of the values of the plurality of counters, for the user;
detecting, by the one or more processors, a text entered by the user in the online service;
obtaining, by a language classifier using the one or more processors, an initial prediction having probabilities for the plurality of languages that the text is in the language;
calculating, by the one or more processors, a language distribution prediction based on the initial prediction and the weighted sum of the counters for each language for the user by multiplying the initial prediction by the weighted sum of the counters, the language distribution prediction comprising a probability, for each language, that the text is in the language;
selecting, by the one or more processors, a language used in the text based on the language distribution prediction; and
causing, by the one or more processors, presentation on a display of a message in the selected language.

11. The system as recited in claim 10, wherein calculating the language distribution prediction further comprises:
utilizing a machine-learning model to calculate the probability for each language that the text is in the language, the machine-learning model receiving, as input, features that comprise the counters, values of the initial prediction, and information about the user, the machine-learning model being trained based on past interactions on the online service by users of the online service.

12. The system as recited in claim 10, wherein the instructions further cause the system to perform operations comprising:
obtaining, for each language, an inferred language probability that indicates a probability that the user speaks that language, wherein calculating the language distribution prediction comprises using the inferred language probability of the plurality of languages for the calculating.

13. The system as recited in claim 10, wherein the plurality of counters for each language comprise user counters associated with interactions of the user and conversation counters associated with conversations in the online service.

14. The system of claim 10, wherein the counters comprise for each user and for each language:
a third counter indicating a Log-Probability-Sum that is a sum of log probabilities for the language across all the language predictions; and a fourth counter indicating a Reciprocal-Rank-Sum that is a sum of an inverse of a rank of the language across all the language predictions.

15. A non-transitory machine-readable storage medium including instructions that, when executed by a machine, cause the machine to perform operations comprising:

for each language in a plurality of languages, utilizing, by one or more processors, a plurality of counters to log use of the language by a user of an online service, the plurality of counters for each language including at least a first counter for logging a Top-Ranked-Count, indicating how many times the language was a top prediction among all language predictions, and a second counter for logging a Probability-Sum, indicating the sum of probabilities for the language across all the language predictions, the plurality of counters being updated based on detecting interactions of the user via the online service using a language of the plurality of languages;

for each language in the plurality of languages, calculating a weighted sum of the values of the plurality of counters, for the user;

detecting, by the one or more processors, a text entered by the user in the online service;

obtaining, by a language classifier using the one or more processors, an initial prediction having probabilities for the plurality of languages that the text is in the language;

calculating, by the one or more processors, a language distribution prediction based on the initial prediction and the weighted sum of the counters for each language for the user by multiplying the initial prediction by the weighted sum of the counters, the language distribution prediction comprising a probability, for each language, that the text is in the language;

selecting, by the one or more processors, a language used in the text based on the language distribution prediction; and causing, by the one or more processors, presentation on a display of a message in the selected language.

16. The non-transitory machine-readable storage medium as recited in claim 15, wherein calculating the language distribution prediction further comprises:

utilizing a machine-learning model to calculate the probability for each language that the text is in the language, the machine-learning model receiving, as input, features that comprise the counters, values of the initial prediction, and information about the user, the machine-learning model being trained based on past interactions on the online service by users of the online service.

17. The non-transitory machine-readable storage medium as recited in claim 15, wherein the machine further performs operations comprising:

obtaining, for each language, an inferred language probability that indicates a probability that the user speaks that language, wherein calculating the language distribution prediction comprises using the inferred language probability of the plurality of languages for the calculating.

18. The non-transitory machine-readable storage medium as recited in claim 15, wherein the plurality of counters comprise user counters associated with interactions of the user and conversation counters associated with conversations in the online service.

19. The non-transitory machine-readable storage medium as recited in claim 15, wherein the counters comprise for each user and for each language:

a third counter indicating a Log-Probability-Sum that is a sum of log probabilities for the language across all the language predictions; and a fourth counter indicating a Reciprocal-Rank-Sum that is a sum of an inverse of a rank of the language across all the language predictions.

* * * * *